(12) United States Patent
Inoue

(10) Patent No.: US 6,421,771 B1
(45) Date of Patent: *Jul. 16, 2002

(54) PROCESSOR PERFORMING PARALLEL OPERATIONS SUBJECT TO OPERAND REGISTER INTERFERENCE USING OPERAND HISTORY STORAGE

(75) Inventor: Aiichiro Inoue, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,998

(22) Filed: Mar. 16, 1999

(30) Foreign Application Priority Data

Jun. 29, 1998 (JP) .......................... 10-182001

(51) Int. Cl.[7] ................................. G06F 9/38
(52) U.S. Cl. ..................... 711/213; 711/210; 711/214
(58) Field of Search ................. 711/210, 213, 711/214; 712/219

(56) References Cited

U.S. PATENT DOCUMENTS 5,075,849 A * 12/1991 Kuriyama et al. .......... 711/200
5,790,823 A * 8/1998 Puzak et al. ................ 712/207
5,813,045 A * 9/1998 Mahalingaiah et al. ..... 711/204

FOREIGN PATENT DOCUMENTS

| JP | 6-89173 | 3/1884 |
|---|---|---|
| JP | A-60-129839 | 7/1985 |
| JP | A-62-84340 | 4/1987 |
| JP | A-1-187634 | 7/1989 |
| JP | 3-212737 | 9/1991 |

* cited by examiner

Primary Examiner—Kenneth S. Kim
(74) Attorney, Agent, or Firm—Staas & Halsey, LLP

(57) ABSTRACT

A register interference state where a register which is updated by a preceding instruction is used by a succeeding instruction, for example, for the generation of an operand address, is detected. When a register interference state is detected, the execution of a succeedingly fetched instruction is started by storing an operand address generated when the succeeding instruction is executed in association with the address of the succeeding instruction. The operand address is estimated which corresponds to the address of the succeedingly fetched instruction and is retrieved from the stored contents.

17 Claims, 13 Drawing Sheets

| V | CTL | IAR (1:16, 29:30) | OAR (1:31) |

FIG. 5

| V | I I D | CTL | I A R ( 1 : 3 0 ) | O A R ( 1 : 3 1 ) |

FIG. 6

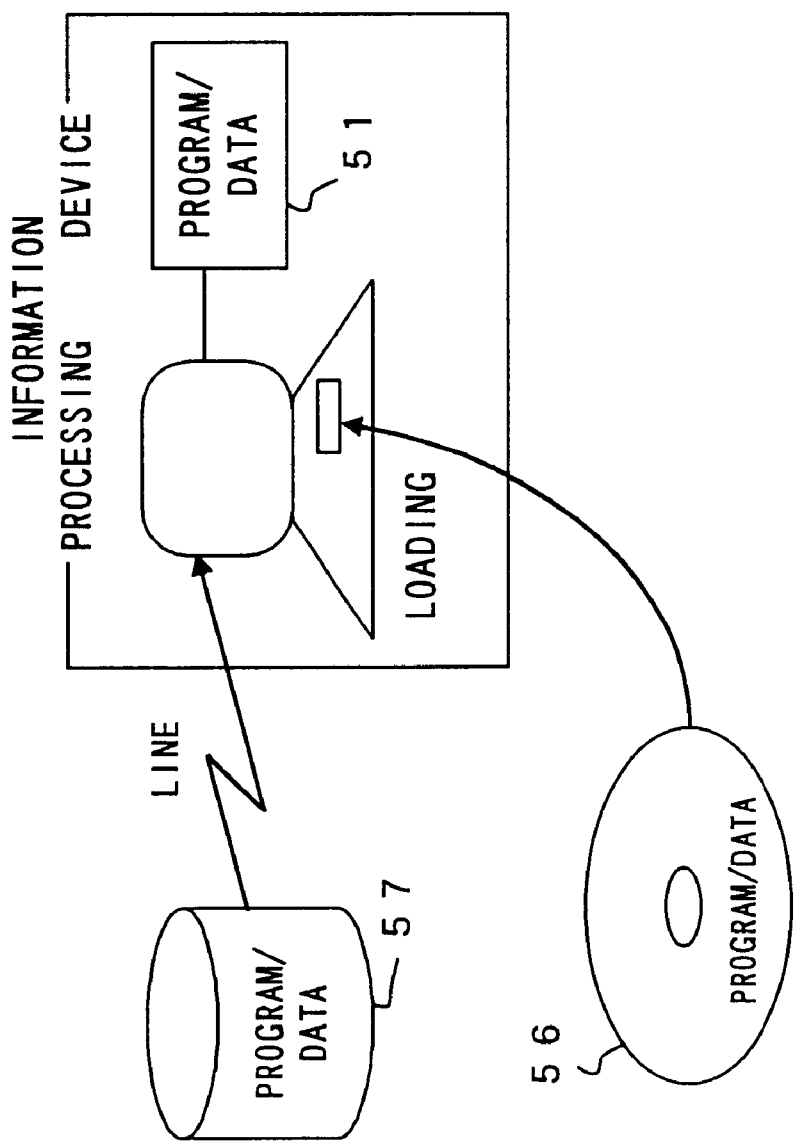
F I G. 13

PROCESSOR PERFORMING PARALLEL OPERATIONS SUBJECT TO OPERAND REGISTER INTERFERENCE USING OPERAND HISTORY STORAGE

BACKGROUND OF THE INVENTION

1. Field of the Invention

The present invention relates to an information processing technique, and more particularly to an information processing technique for realizing high performance with parallel instruction processing by adopting pipeline processing, out-of-order processing, etc.

2. Description of the Related Art

If there is an interference relationship of an instruction operand, that is, if there is a relationship where the contents of a resource updated by a preceding instruction are referenced by a succeeding instruction within an information processing device, the state where the preceding instruction affects the execution of the succeeding instruction, for example, the state where the succeeding instruction cannot be executed until the execution of the preceding instruction is completed, occurs. If it is necessary to guarantee the same result as that in the case where instructions are sequentially executed in the order instructed by an instruction program, the instructions cannot be executed in parallel. Therefore, the hardware performance for realizing a high throughput cannot be fully utilized, which leads to a degradation of the overall performance of the information processing device.

Among such operand interference relationships, the register interference state where the contents of a register updated by a preceding instruction are used and referenced by a succeeding instruction, by way of example, for the generation of a main storage operand address, is an EGI (Execute Generate Interlock). The EGI is a principal factor that degrades the entire throughput of an information processing device.

Such register interference occurs due to the time difference between when the contents of a register are normally updated by a preceding instruction upon completion of instruction processing, and when an operand address is generated by a succeeding instruction in a relatively early stage of the instruction processing.

As a means for reducing the occurrences of the register interference, the method for directly bypassing data yet to be stored in a register to an adder for generating an operand address, that is, an EAG (Effective Address Generator) is implemented. FIG. 1 shows the pipeline processing performed in such a case.

The upper portion of FIG. 1 shows the operations of instruction pipeline processing in the case where no register interference state, that is, no EGI occurs. These pipeline operations are composed of a cycle D for decoding an instruction, a cycle A for generating an address, a cycle T for translating an address by using accesses to a translation look-aside buffer and a tag, a cycle B for reading an operand from a buffer, a cycle U, for example, for executing an arithmetic operation and updating an RUB (Register Update Buffer), and a cycle W for writing a result of the arithmetic operation to a GR (General-purpose Register). The operand for the arithmetic operation is loaded from an LBS (Local Buffer Storage) to an LR (Load data Register) on the cycle B, and is used for executing the arithmetic operation on the cycle U.

The lower portion of FIG. 1 explains the pipeline operations when register interference occurs. The EGI as the register interference state is detected by an EGI detecting circuit not shown in this figure according to the result of instruction decoding. An address calculation is postponed until the contents of a BR (Base Register), an XR (index Register), and a DR (Displacement Register), which are required for calculating an address of a main storage operand, are established on the cycle A. Then, the data to be stored in the BR and the XR are provided from the LBS as EA1 and EA2 by bypassing the BR and the XR, and the value of the DR is provided as EA3 on a priority cycle $P_a$ of the address calculation, so that the operand address is generated by an EAG on the address generation cycle A. Here, an arithmetic operation execution cycle X precedes the update cycle U and is independent therefrom, and the result of the arithmetic operation is once stored in an RR (Result Register).

As explained by referring to FIG. 1, even an information processing device equipped with high performance cache has a problem in that a plurality of cycles are lost and the parallel processing capability of instruction execution significantly degrades, because the establishment of the contents of a register to be updated by a preceding instruction must be waited for, even if the contents of the register, which are used for an address calculation, are bypassed and used before being stored in the register. The more superior the parallel processing capability the information processing device possesses for the realization of high performance, the greater the number of cycles are lost. As a result, specifically designed high performance cannot be fully utilized.

SUMMARY OF THE INVENTION

The present invention aims at overcoming the above described problems, and at providing an information processing device and method for preventing performance from being degraded by storing an operand address generated by a succeeding instruction as a previous execution result when an EGI occurs, by estimating an operand address based on the previous execution result, and by starting instruction execution before generating an actual operand address.

The information processing device according to the present invention includes a detector which detects a register interference state where a register whose contents are rewritten by a preceding instruction is used by a succeeding instruction so as to generate an operand address, and an operand address history storage which stores the operand address generated when a succeeding instruction is executed in association with the address of the succeeding instruction, if the register interference state is detected by the detector.

The operand address history storage may include an area for storing a branch destination address obtained when a branch instruction is executed in association with the address of the branch instruction, and a flag for making a distinction from the area where the operand address is stored in association with the address of the succeeding instruction.

Additionally, the information processing device according to the present invention may further include an instruction fetcher which presents an operand address along with an fetched instruction to an instruction executing unit for executing the fetched instruction, when the operand address is retrieved from the contents stored within the operand address history storage by using the address of the fetched instruction at the time of the instruction fetch operation from main storage.

Furthermore, the information processing device according to the present invention may further include a reservation station which stores the operand address presented by the instruction fetcher along with the address of the fetched instruction in order to perform a stack process for holding instructions to be executed.

Still further, the instruction executing unit included in the information processing device according to the present invention may start instruction execution including the fetch operation of a main storage operand by using the presented operand as an estimated operand address prior to the generation of the operand address corresponding to the fetched instruction, when the operand address retrieved from the operand address history storage is presented by the instruction fetcher.

Still further, the information processing device according to the present invention may further include an operand address comparator which stores an estimated operand address when instruction execution is started by using the presented operand address as the estimated operand address, and for making a comparison between the estimated operand address and the operand address generated when the register used by the fetched instruction in order to generate an operand address becomes available, wherein if these two operand addresses match, the execution of the process corresponding to the fetched instruction is continued unchanged.

Still further, the instruction executing unit included in the information processing device according to the present invention may further invalid the result of the instruction execution with the estimated operand address, and for re-executing the instruction by using the generated operand address, if the operand address comparator detects that the two operand addresses mismatch.

Still further, the operand address history storage may further store as control information the information about an event which causes an estimated operand address error in association with the address of the succeeding instruction, if the operand address comparator detects that the two operand addresses mismatch.

Still further, the operand address history storage may further store the estimated operand address error in association with the address of the succeeding instruction, and at the same time, the instruction executing unit included in the information processing device according to the present invention may further postpone the execution of a succeedingly fetched instruction until an operand address is generated after the register used by the succeedingly fetched instruction in order to generate an operand address becomes available, even if the estimated operand address is retrieved from the contents stored within the operand address history storage according to the address of the succeedingly fetched instruction at the time of the fetch operation of the instruction succeeding the fetched instruction from the main storage, if the operand address comparator detects that the two operand addresses mismatch.

Still further, the information processing device according to the present invention may further include a second instruction fetcher which modifies a stored estimated address based on the control information, and for presenting to the instruction executing unit which executes the fetched instruction the modified address as a newly estimated address along with the succeedingly fetched instruction, when the control information is retrieved from the contents stored within the operand address history storage according to the address of the succeedingly fetched instruction at the time of the fetch operation of the instruction succeeding the fetched instruction from the main storage.

An information processing method according to the present invention includes: a first step of detecting a register interference state where a register whose contents are rewritten by a preceding instruction is used by a succeeding instruction so as to generate an operand address; and a second step of storing the operand address generated when the succeeding instruction is executed, in association with the address of the succeeding instruction when the register interference state is detected in the first step.

Additionally, the information processing method according to the present invention may further include a third step of presenting the operand address along with a fetched instruction to an instruction executing unit which executes the fetched instruction, when the operand address is retrieved from the contents stored in the second step according to the address of the fetched instruction at the time of the fetch operation of the instruction from the main storage.

Furthermore, the third step may include a step of making the instruction executing unit start the instruction execution including the fetch operation of a main storage operand by using the presented operand address as an estimated operand address prior to the generation of the operand address corresponding to the fetched instruction, when the operand address retrieved from the contents stored in the second step is presented.

Still further, the information processing method according to the present invention may further include a fourth step of storing an estimated operand address, and of making a comparison between the estimated operand address and the operand address generated when the register used by the fetched instruction in order to generate an operand address becomes available, when the presented operand address is used as the estimated operand address, wherein the execution of the process corresponding to the fetched instruction is continued unchanged if the two operand addresses match.

Still further, the information processing method according to the present invention may further include a step of invalidating the result of the instruction execution by using the estimated operand address, and of re-executing the instruction by using the generated operand address, if a mismatch between the two operand addresses is detected in step four.

The above described information processing device and method can be respectively implemented by using computers. To make a computer implement an information processing algorithm, the above described method is represented as a computer program.

A (storage) medium according to the present invention is a computer-readable medium storing a program which enables a computer to implement information processing. Its execution method corresponds to the above described method according to the present invention. This medium can be implemented as an external storage medium such as an optical storage medium including a CD-ROM, etc., a magnetic storage medium including a floppy disk, etc., or an internal storage medium including a hard disk, a ROM, a RAM, etc.

As described above, according to the present invention, it becomes possible to start the execution of a succeeding instruction by using an estimated operand address as a previous execution result before an actual operand address is generated.

BRIEF DESCRIPTION OF THE DRAWINGS

FIG. 5 explains the method for storing data in the respective entries of the operand address history;

FIG. 6 explains the method for storing data in each entry of a reservation station for generating a bypass;

FIG. 13 shows computer-readable storage media which can provide a program and data to the information processing device shown in FIG. 11.

DESCRIPTION OF THE PREFERRED EMBODIMENT

Provided below is the explanation about the details of a preferred embodiment according to the present invention.

Figure 2:
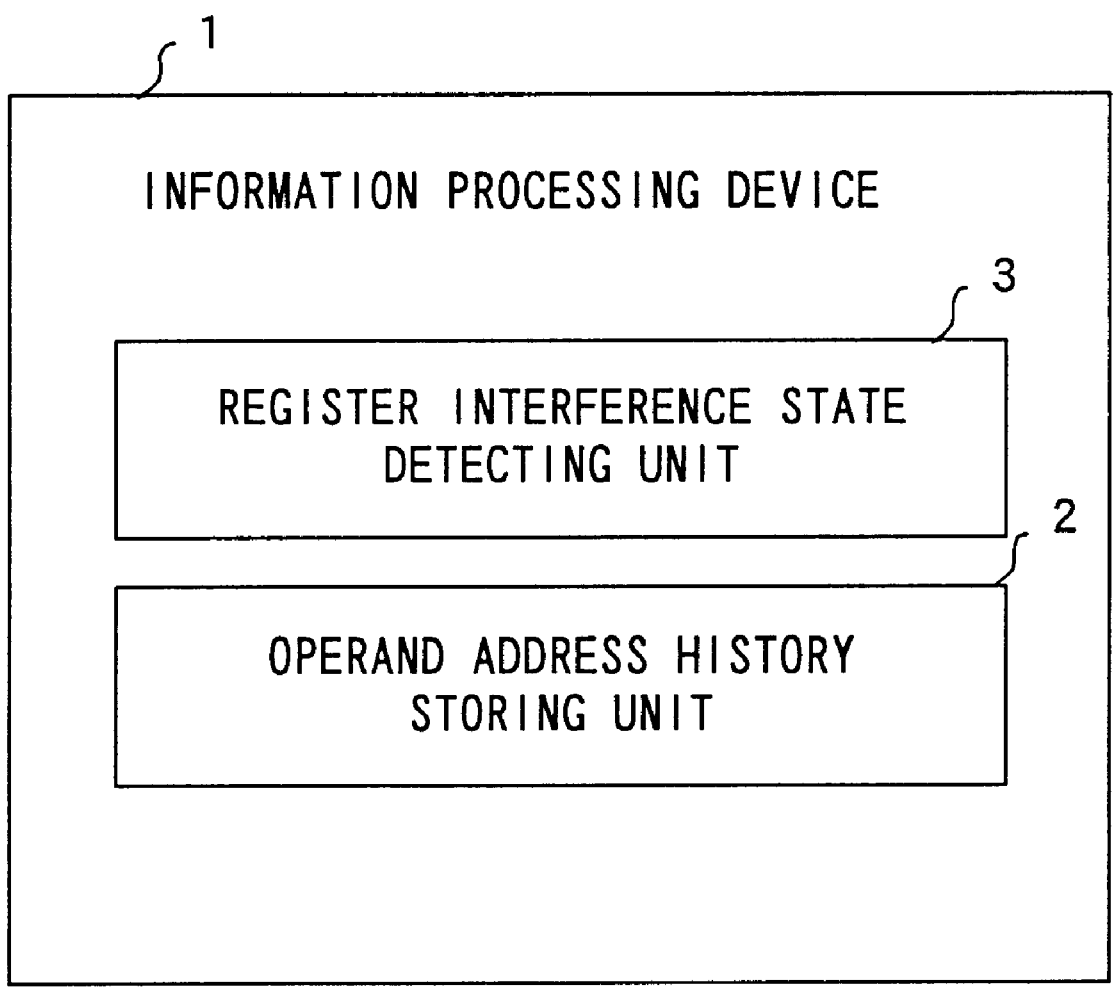
FIG. 2 is a block diagram showing the principle of the configuration according to the present invention.

FIG. 2 is a block diagram showing the principle of the configuration according to the present invention. This figure shows the principle of an information processing device 1 which includes a register interference state detecting unit 3 and an operand address history storing unit 2.

In FIG. 2, the register interference state detecting unit 3 is intended to detect a register interference state (EGI) where a register whose contents are rewritten by a preceding instruction are used by a succeeding instruction for the generation of an operand address. The operand address history storing unit 2 stores the operand address generated at the time of the execution of the succeeding instruction in association with the address of the succeeding instruction, when the register interference state is detected by the register interference state detecting unit 3. The operand address history storing unit 2 is, for example, an OAHIS (Operand Address History) system.

According to the preferred embodiment of the present invention, an operand address is estimated by using the contents stored in the operand address history storing unit 2. The information processing device according to the preferred embodiment of the present invention may further include an instruction fetching unit for presenting an operand address as an estimated operand address along with a fetched instruction to an instruction executing unit for executing the fetched instruction, when the operand address is retrieved from the operand address history storing unit 2 according to the address of the fetched instruction at the time of the fetch operation of the instruction from the main storage.

Additionally, the instruction executing unit included in the information processing device according to the preferred embodiment of the present invention may further start instruction execution including the fetch operation of a main storage operand with the estimated operand address prior to the generation of the operand address corresponding to the fetched instruction, for example, when an estimated operand address is presented by the instruction fetching unit.

Furthermore, the information processing device according to the preferred embodiment may further include an operand address comparing unit for holding an estimated operand address when the instruction execution is started, for example, by using the estimated operand address, and for making a comparison between the estimated operand address and the operand address generated when the register which is used by the fetched instruction in order to generate an operand address becomes available. If these two operand addresses match, the execution of the process corresponding to the fetched instruction may be continued.

If the operand address comparing unit detects that the two operand addresses mismatch, the result of the execution of the instruction using the estimated operand address is invalidated, and the instruction can be re-executed by using the generated operand address.

Still further, the information processing device according to the preferred embodiment may further include a reservation station unit for storing the operand address presented by the above described instruction fetching unit along with the address of the fetched instruction in order to perform the stack process for holding the instructions to be executed.

Still further, the operand address history unit 2 may include an area for storing a branch destination address obtained when a branch instruction is executed in association with the address of the branch instruction, and an area for storing a flag for making a distinction between areas, in addition to the area for storing an operand address in association with the address of the succeeding instruction.

As described above, according to the present invention, it becomes possible to start the execution of a succeeding instruction by using an estimated value of an operand address as a previous execution result before an actual operand address is generated.

Figure 3:
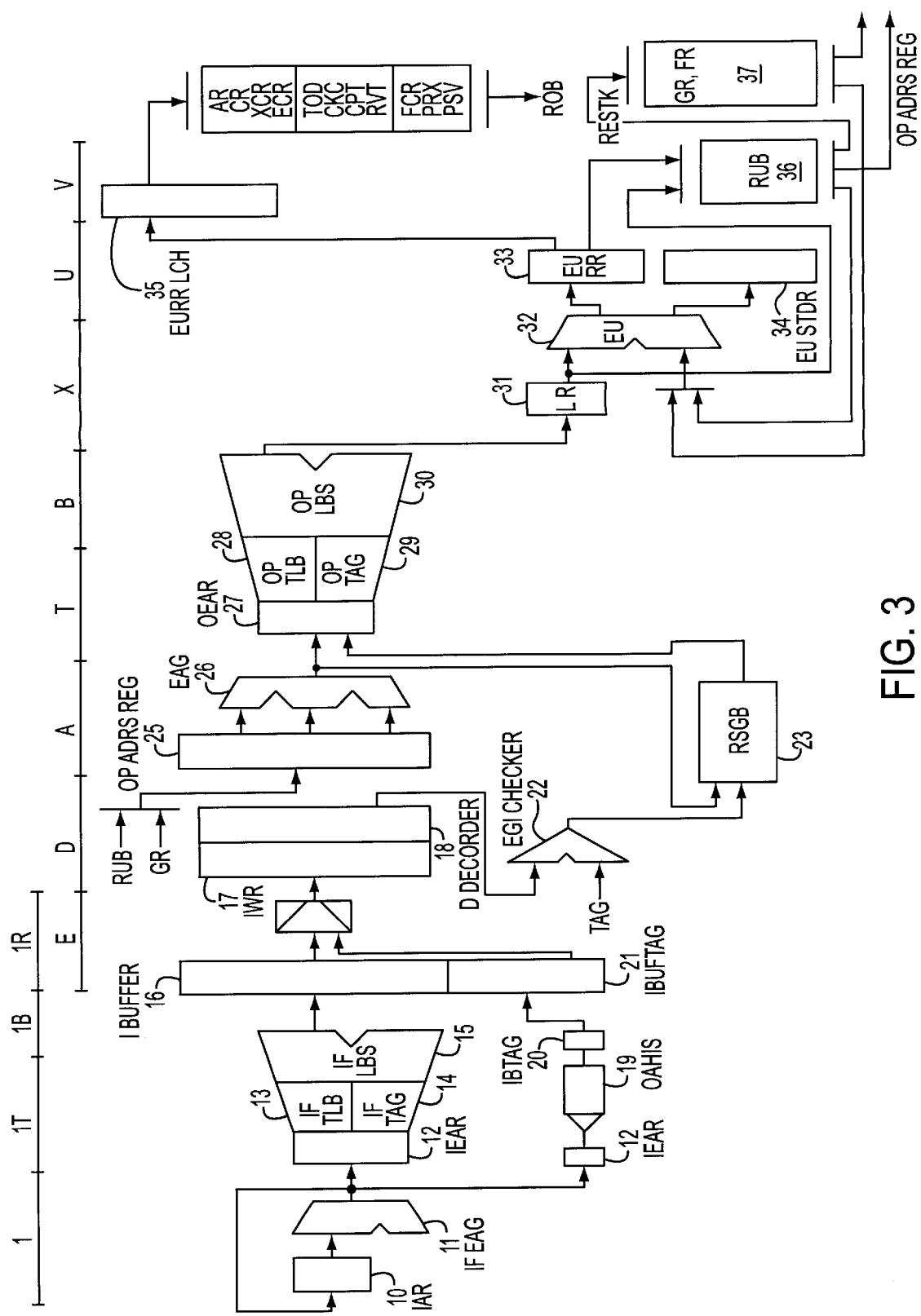
FIG. 3 is a schematic diagram showing the configuration of an information processing device with an instruction controlling unit as a center, which performs the operations by using an operand address history, according to the present invention.

FIG. 3 is a schematic diagram showing the configuration of the information processing device with an instruction controlling unit (I unit) as a center, in which instructions are executed based on an estimated operand address by taking full advantage of an operand address history, according to the present invention. The portions which relate to the present invention will be mainly explained by referring to this figure.

In FIG. 3, an IAR (Instruction Address Register) 10, an IFEAG (Instruction Fetch Effective Address Generator) 11, an IEAR (Instruction Effective Address Register) 12, an IFTLB (Instruction Fetch Translation Look-aside Buffer) 13, an IFTAG (Instruction Fetch Tag) 14, and an IFLBS (Instruction Fetch Local Buffer Storage 15 perform part of instruction fetch pipeline operations.

The instruction fetch pipeline operations are composed of an instruction fetch request issuance cycle I, an access cycle IT to a tag and a TLB, a buffer access cycle IB, and a fetch completion cycle IR. The instruction fetched from the main storage is provided to an instruction buffer 16.

The instruction provided to the instruction buffer 16 is decoded by an instruction word register (IWR) 17 and a decoder 18 on the initial instruction presentation cycle E and the decoding cycle D of the instruction decoding/arithmetic operation execution pipeline processing.

By way of example, the address of a main storage operand is calculated in correspondence with the result of the decoding of the instruction. For this address calculation, the address generation data such as a base value, an index value, a displacement value, etc. are provided from an RUB (Register Update Buffer) 36 or from a GR (General-purpose Register) 37 to an EAG (Effective Address Generator) 26 via an OP ADRS REG (Operand Address Register) 25, so that the operand address is generated. The generated operand address is stored in an OEAR (Operand Effective Address Register) 27. Since the operations performed by the respective blocks shown in FIG. 3 after the generation of the operand address do not directly relate to the operations of the present invention, their explanations are omitted here.

The constituent elements which are shown in FIG. 3 and feature the present invention are an OAHIS (Operand Address HIStory) 19, an EGI checker 22, and an RSGB (Reservation Station for Generating a Bypass) 23.

The result of the decoding by the decoder 18 is compared with by the EGI checker 22, for example, a register number to which the result of the execution of a preceding instruction as part of tag information of the preceding instruction is written. If the number of the register used for generating an address, which is resultant from the decoding of the current instruction, matches the number of the register to which the result of the execution of the preceding instruction is written, the EGI as a register interference state is detected. The application which was previously filed by the present inventor refers to the circuit for detecting the EGI as an interference checking circuit for a general-purpose register.

Japanese Laid-open Patent Gazette (No. 3-212737): Interlock Control Method for an Access Register, Toyonishi and Inoue When the EGI is detected, the entry for storing a current instruction address is generated within the RSGB 23. In this case, the operand address is generated after the register to be used becomes available as explained by referring to FIG. 1. The operand address generated by the EAG 26 is stored in the same entry within the RSGB 23 in correspondence with the current instruction address.

Similarly, the contents included within the RSGB 23 are stored as a pair of an instruction address and a generated operand address in the entry generated within the OAHIS 19 upon completion of the instruction processing. For example, when the next instruction is fetched, the contents stored within the OAHIS 19 are searched by using the contents of the IEAR 12 including the address of the next instruction. Whether or not the next instruction address matches the address stored within the OAHIS 19, that is, whether or not the next instruction address hits the OAHIS 19, a corresponding operand address if a hit is found, and other information are set in an instruction buffer tag 21 from an IBTAG 20 tag on an instruction fetch cycle IB. The set information are provided to the decoder 18 as a D tag via the IWR 17 on an instruction execution cycle D.

The EGI is detected by the EGI checker 22 on the D cycle in a similar manner as in the above provided explanation. If the EGI is detected, an entry is generated within the RSGB 23 at the end of the D cycle. A validity flag, whether an OAHIS 19 hit or an OAHIS 19 miss occurs, other control flags, and the address of the instruction itself (IAR) are registered to the entry. If an OAHIS 19 hit is detected to occur, also the operand address stored within the OAHIS 19, that is, an estimated operand address (OAR) is stored.

Because the operations after the D cycle differ depending on whether a fetched instruction either hits or misses the OAHIS 19, and on whether its estimated address is either correct or wrong, they will be explained later.

Figure 4:
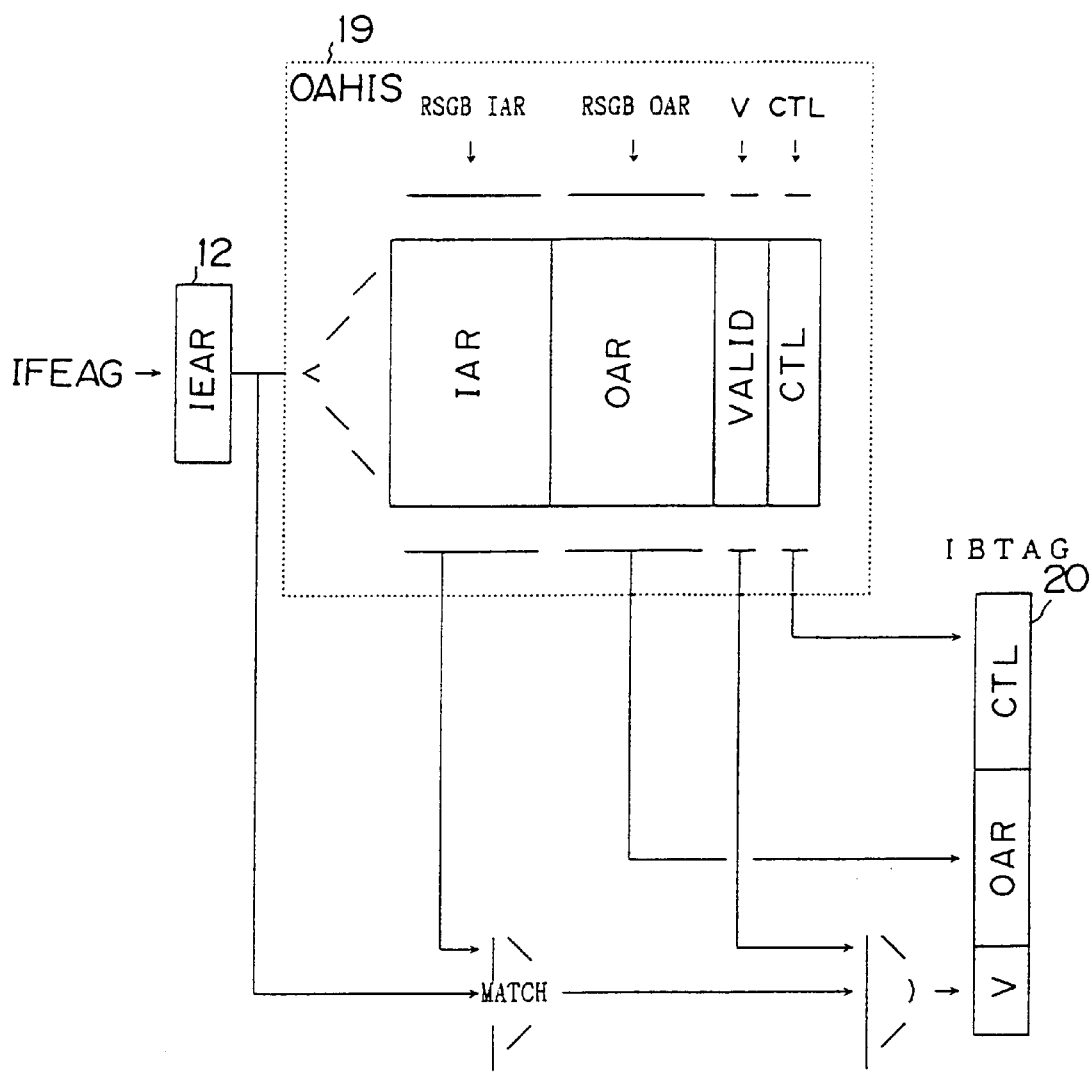
FIG. 4 is a schematic diagram explaining the configuration of the operand address history and its operations.

FIG. 4 is a schematic diagram explaining the configuration of the OAHIS 19, and its operations. In this figure, the OAHIS 19 is composed of an area for storing an address of an instruction IAR from the RSGB 23 shown in FIG. 3, and an operand address OAR corresponding to the instruction, an area for storing "V" which indicates a validity flag, and an area for storing control information CTL. As the control information CTL, a flag indicating an error when an estimated operand address is wrong is stored, as will be described later.

In FIG. 4, the IAR is searched according to the contents of the IEAR 12 in which the fetched instruction address transmitted from the IFEAG 11 shown in FIG. 3 is stored. If a matching IAR is determined to exist and if the validity flag of this entry is valid, the corresponding operand address OAR, the control information CTL, and the validity flag V are stored in an IBTAG 20.

Figure 5:
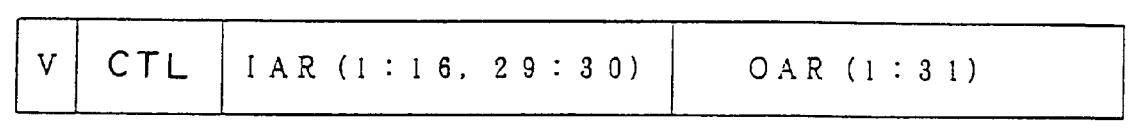

FIG. 5 explains the data storage format in each entry of the OAHIS 19. As shown in this figure, the validity flag V, the control information CTL, the instruction address IAR, and the operand address OAR corresponding to the instruction are stored in each entry. According to the preferred embodiment according to the present invention, the bits 17 through 27 of the IAR are used, for example, as an address in the direction of the depth of a RAM, while a bit 28 is used for selecting an even/odd bank. This is because the RAM has a 2-way and 4-bank configuration including the total 8K composed of 4 2K- entries, that is, the RAM is configured by set-associative entries. However, such a RAM configuration does not directly relate to the present invention.

Figure 6:
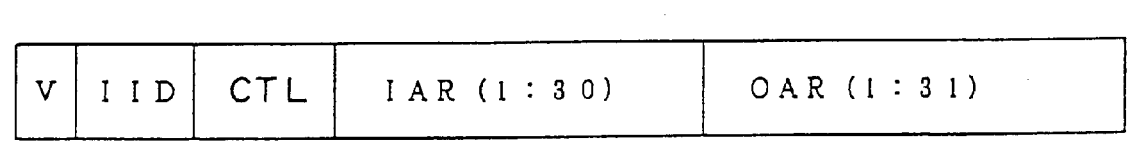

FIG. 6 explains the data storage format in each entry of the RSGB. In this figure, each entry includes the validity flag V, the control information CTL such as an instruction identifier IID stored in correspondence with an instruction execution order when an entry is generated, whether or not an instruction address hits the OAHIS 19, etc., the instruction address IAR, and the corresponding operand address OAR.

An estimated address is initially set in the entry OAR (Operand AddRess) of the RSGB if an OAHIS 19 hit occurs. When the register which is used for generating an address actually becomes available, a generated address is compared with the contents of the OAHIS 19. If the comparison results in a mismatch, the generated address is set and this correct address is used for rewriting the OAR of the OAHIS 19 upon completion of the instruction.

Figure 7:
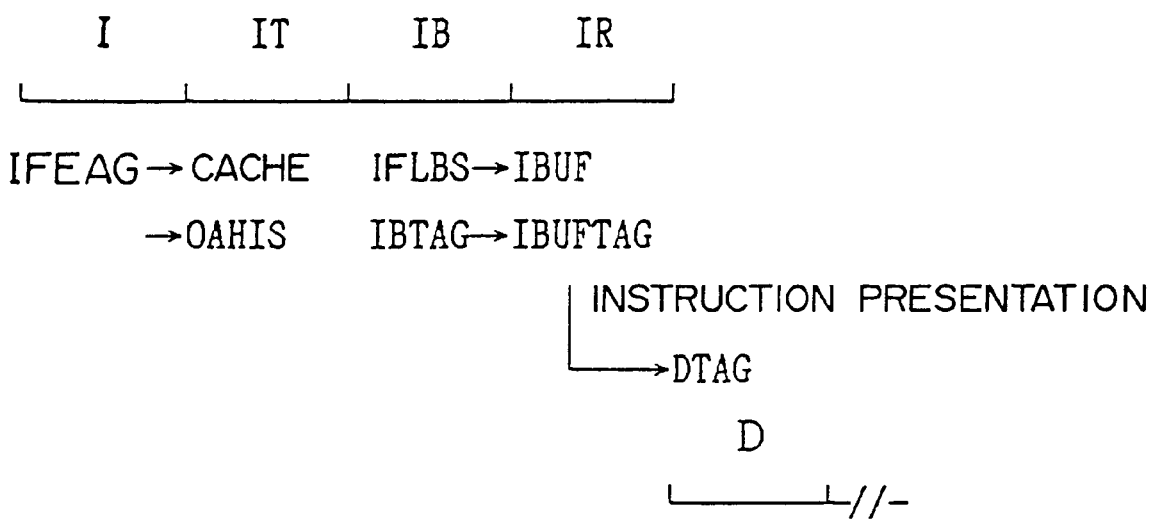
FIG. 7 is a time chart explaining instruction fetch pipeline processing according to a preferred embodiment of the present invention.
Figure 8:
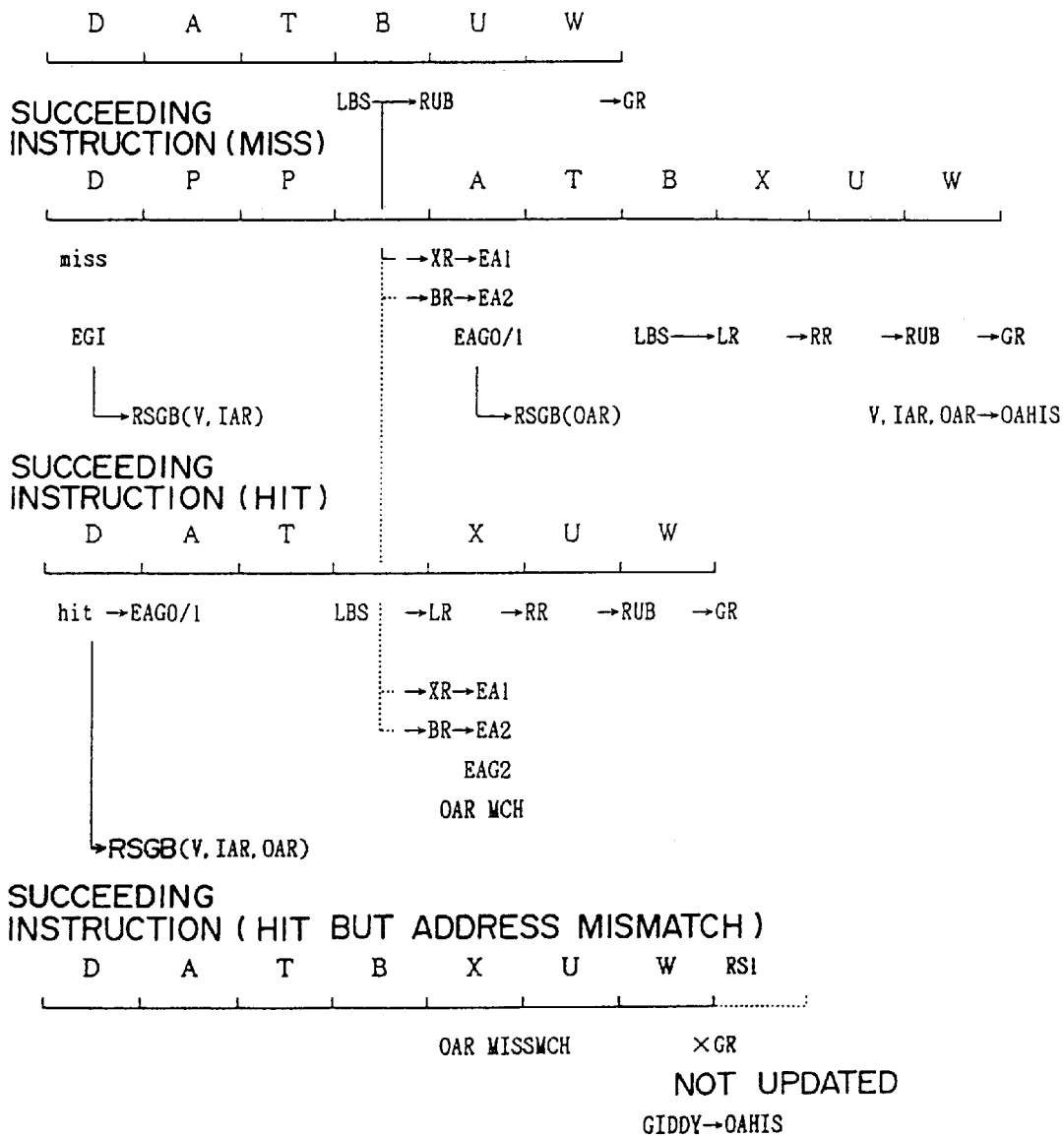
FIG. 8 is a time chart explaining instruction execution pipeline processing according to the preferred embodiment of the present invention.
Figure 9:
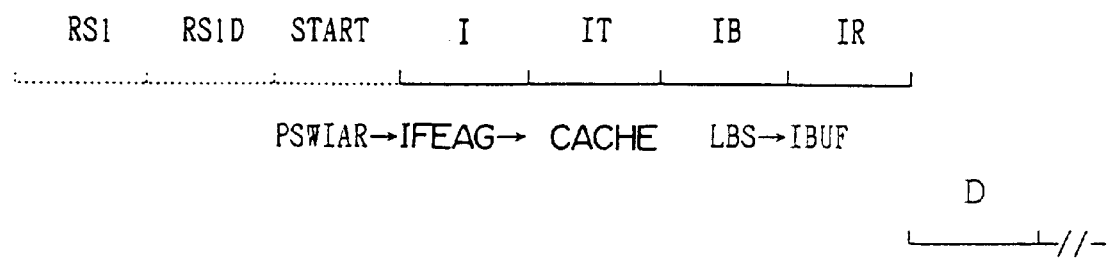
FIG. 9 is a time chart showing the instruction fetch pipeline processing performed when an instruction is re-executed, according to the preferred embodiment of the present invention.

Provided next is the explanation about the operations performed by using the OAHIS 19 according to the preferred embodiment of the present invention, by referring to the time charts shown in FIGS. 7 through 9. FIG. 7 explains the operations of the instruction fetch pipeline processing. A cache is searched by using the address of the fetched instruction output from the IFEAG 11 on the cycle I. Also the OAHIS 19 is searched at this time. The contents of the IFLBS 15 are provided to the instruction buffer 16, and the output from the OAHIS 19, that is, the contents of an IBTAG 20 are provided to an instruction buffer tag 21.

The contents of the IBTAG 20 are used as a D tag on the decoding cycle D via the instruction presentation cycle E.

FIG. 8 is a time chart explaining the differences between the processes using the OAHIS 19, which are caused by the differences of the relationship between a preceding and a succeeding instruction. The time chart shown in this figure is explained based on the assumption that the preceding instruction is a load instruction L. The contents of the IFLBS 15 are stored in the RUB 36 in correspondence with this preceding instruction, and the written data resultant from an arithmetic operation is stored in the GR 37 on the write cycle W.

For the succeeding instruction, its process fundamentally differs depending on whether the address of the succeeding instruction either hits or misses the OAHIS 19. If an OAHIS 19 miss occurs, that is, if the address of the succeeding instruction is not registered as an instruction address IAR within the OAHIS 19, the validity flag V and the address IAR of the succeeding instruction are stored in the RSGB 23 when the EGI is detected by the EGI checker 22 on the decoding cycle D.

Figure 1:
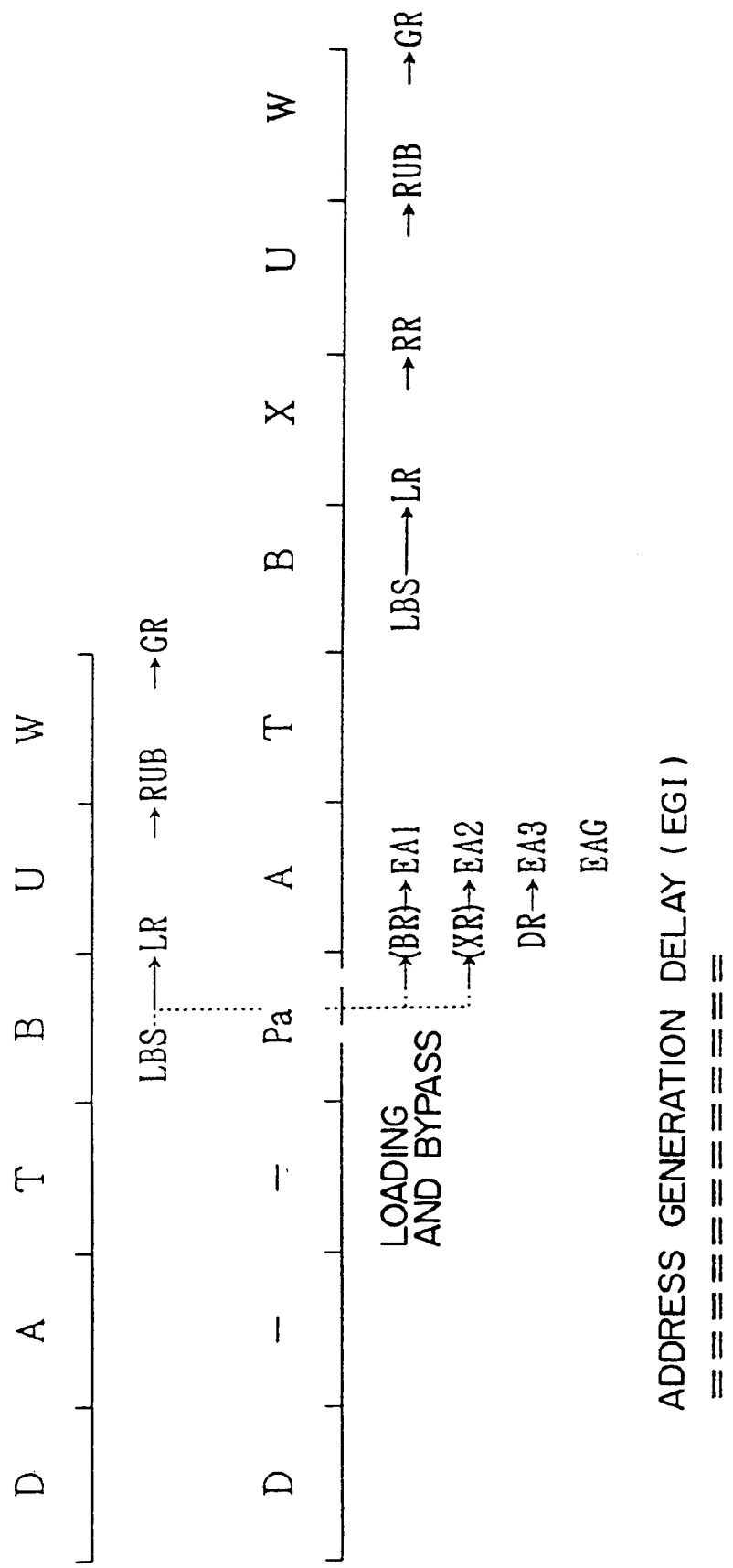
FIG. 1 is a time chart for explaining a delay of address generation due to an EGI.

In a similar manner as in FIG. 1, the generation of the operand address of the succeeding instruction is postponed until the fetch operation of a main storage operand is completed in correspondence with the preceding instruction, that is, the load instruction L, and its data is prepared. When the data is established on the buffer cycle B corresponding to the LOAD instruction L, it is directly input to an index register XR and a base register BR. These data are used as the address generation data EA1 and EA2, and a necessary addition operation is performed by the EAG 26. As a result, an operand address EAGO/1 is generated, and is stored as an OAR in the entry of the RSGB 23 in correspondence with the IAR.

The operations after this process are similar to those in FIG. 1. Upon completion of the succeeding instruction, the information stored within the RSGB 23, that is, the instruction address IAR, the corresponding operand address OAR, and the validity flag V are transmitted to the OAHIS 19. Consequently, a new entry generated and stored as an instruction execution result.

If an OAHIS 19 hit occurs, that is, if the address of the succeeding instruction matches an IAR stored in the OAHIS 19, the corresponding operand address is transmitted to the EAG 26 as an EAGO/1, and a new entry is generated within the RSGB 23. The validity flag V, the instruction address IAR, and the operand address OAR are stored in this entry. The operand address OAR transmitted to the EAG 26 is used as an estimated operand address, and the execution of the succeeding instruction, that is, the process corresponding to the succeeding instruction including the fetch operation of the main storage operand is started.

Apart from this process, an operand address is generated by the EAG 26 when the fetch operation of the main storage operand with the load instruction as the preceding instruction is completed and its data is prepared, in a similar manner as in the case where an OAHIS 19 miss occurs. The generated operand address is a correct address conforming to an instruction execution order. This address is transmitted to the RSGB 23, where the transmitted address is compared with an operand address registered thereto, that is, an estimated operand address. If the comparison results in a match, the execution of the process corresponding to the succeeding instruction is continued as an OAR match.

If the comparison between the correct operand address and the estimated operand address results in a mismatch, the estimated address is determined to be an error and the result of the process performed by using the estimated address is proved to be incorrect. The time chart in this case is the one shown in the bottom of FIG. 8. If a mismatch between a correct operand address and an estimated operand address, that is, if an OAR mismatch is determined, the previously executed instruction execution process using the estimated operand address is aborted, and the process must be again performed. That is, the result of the process is not written to the GR 37 on the write cycle W as the last cycle of the instruction execution pipeline processing, and the GR 37 is not updated. Then, a GIDDY flag indicating that the estimated operand address is wrong is written to the entry of the OAHIS 19 in which the wrong estimated address is stored. Additionally, the transition to an RS1 state shown in FIG. 9 is made in order to re-execute the instructions.

FIG. 9 explains the instruction fetch pipeline processing for re-executing instructions. In this figure, the process in an RS1D state is performed after the RS1 state is continued from FIG. 8. This state is a delay cycle of the RS1 state, and the transition to the next state is caused on an RS1 state+1 cycle. The next state START is a state for instructing the entry of the process state to execute instructions. On the first cycle I of the instruction fetch pipeline processing, the contents of a PSWIAR (Program Status Word Instruction Address Register) are provided to the IFEAG 11, and a cache is searched by using the provided contents. Although the following operations are similar to those in FIG. 7, the contents of the OAHIS 19 are not used.

If an instruction is fetched for being re-executed by using the instruction address IAR stored within the RSGB 23, a processing delay accompanying the instruction re-execution can be reduced to some extent.

Figure 10:
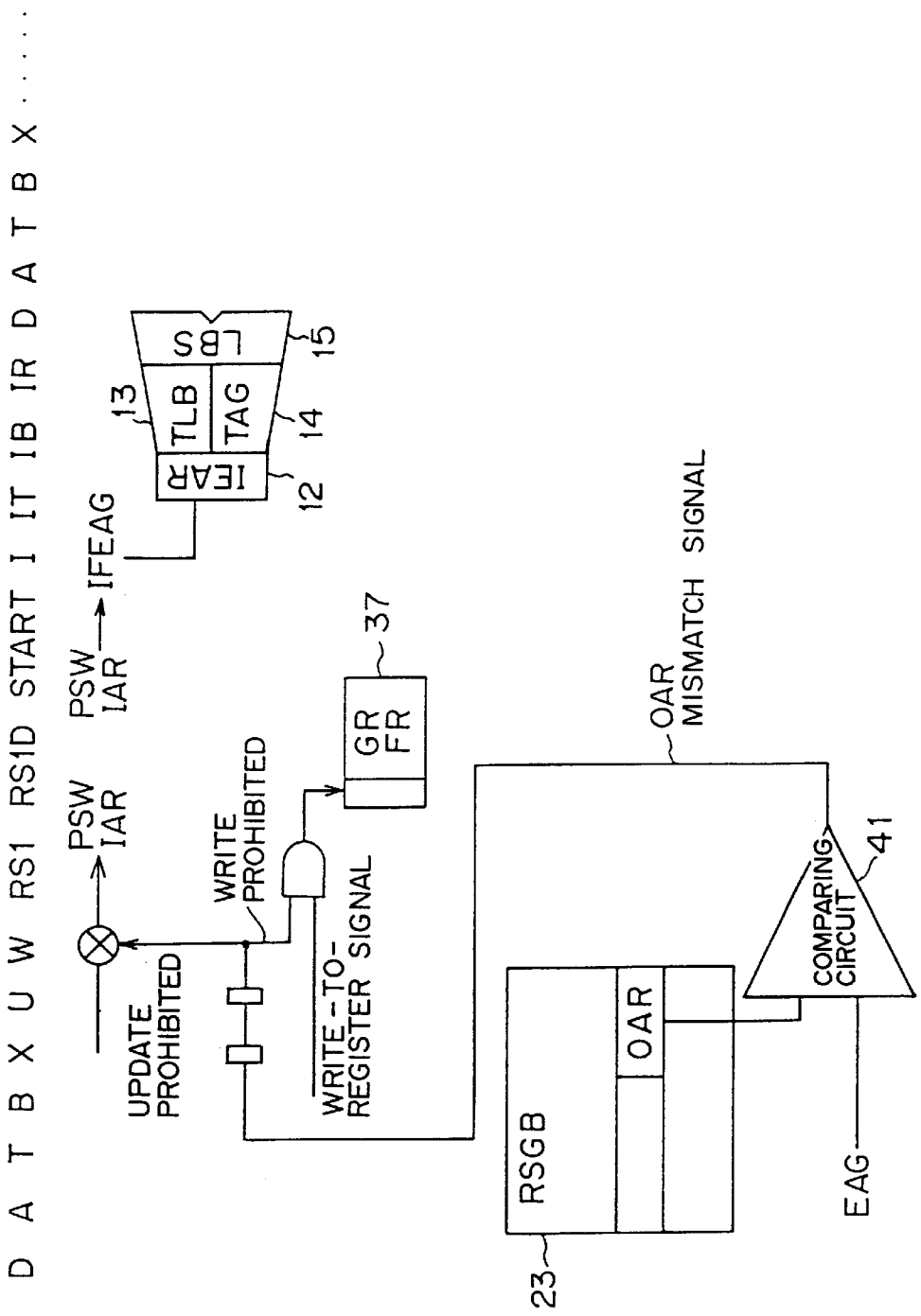
FIG. 10 explains the details of the pipeline operations when a correct operand address and an estimated operand address mismatch.

FIG. 10 explains further details of the instruction re-execution pipeline processing if a mismatch between a correct operand address and an estimated operand address is found. In this figure, the comparison between the correct operand address generated by the EGA 26 and the estimated operand address stored within the RSGB 23 is made by a comparing circuit 41. If a mismatch between the operand addresses is found, this result is used as the signal for prohibiting a data write to the GR/an FR (Floating-point Register) 37 shown in FIG. 3, and the signal for prohibiting an update of the PSWIAR, that is, the register providing the address of a succeedingly fetched instruction. By providing "L" as these signals, the write of an instruction execution result to the register GR/FR 37 and the update of the PSWIAR are prohibited. As explained by referring to FIG. 9, the value of the PSWIAR, that is, the address of the instruction for which the execution is aborted, is provided to an instruction pipeline. The instruction execution result is finally stored in the GR/FR 37 on the cycle W for writing the instruction execution result and the PSWIAR is updated, although this is not shown in this figure.

If the comparison between an actually generated operand address and an estimated operand address results in a mismatch as described above, the estimated address in the corresponding entry within the OAHIS 19 is rewritten. The reason why the rewrite operation is performed is that an estimated address error is prevented from occurring when the same sequence, that is, the instruction at the same address is re-executed.

Additionally, the entry causing an estimated address error may simply be deleted from the OAHIS 19. As a better method, however, the method for registering an estimate error by writing the GIDDY flag indicating an estimated address error to the entry as part of the control information may be adopted in this preferred embodiment. If the entry in which the GIDDY flag is ON is searched, the operand address stored in the OAHIS 19 is not used even if an instruction address hits the OAHIS 19. Therefore, the instruction can be executed after an operand address is generated by the EAG 26 in a similar manner as in the case where an OAHIS 19 miss occurs.

Furthermore, assume that an instruction address is sequentially incremented by using a certain offset value. In this case, the flag indicating that the address is incremented and the offset value are stored in the entry of the OAHIS 19 as control information. When this entry is read at the time of an instruction address match, the offset value is added to the OAR stored in the entry according to the flag, so that the resultant value may be used as a modified value of an estimated operand address. If a different address is generated as an instruction address every other time, the method for registering the address generation status to the control information as a flag, and for generating and using the estimated operand address corresponding to the different address when the entry is searched, may be considered. Since a variety of methods can be considered as such an estimate error preventing method, the above described information such as flags, etc. are together shown and referred to as the CTL in this preferred embodiment.

The OAHIS 19 is configured by using a RAM in the above described explanation. A further preferred embodiment of the present invention may include as a similar scheme a branch history which serves as a mechanism for estimating the branch destination address of a branch instruction, that is, the target address when a branch is enabled. The branch history is explained in detail in the previous application of the present inventor.

Japan Laid-open Patent Gazette No. 6-89173 Instruction Execution Processing Device Having a Branch History by Inoue.

The entries of the branch history include the instruction address when an instruction is a branch instruction, a target address as a branch destination, a flag indicating validity, etc. A RAM configuring the OAHIS 19 can be used also as a RAM configuring a branch history in common. If the RAM is used also as the branch history, the distinction between a branch history entry and an OAHIS 19 entry can be made by storing the destination address which is generated by the EAG when a branch instruction is executed instead of an operand address, and by registering as a flag the status where this entry is used as a branch history entry.

When an instruction is fetched, the instruction within, for example, the above described RAM is accessed by using the address of the instruction. Note that, however, if a searched entry is a branch history entry, the value of the destination address which is read out and set in the instruction buffer tag 21 is provided to an instruction fetch pipeline, and the instruction at the branch destination is used and fetched prior to the execution of the branch instruction.

Figure 11:
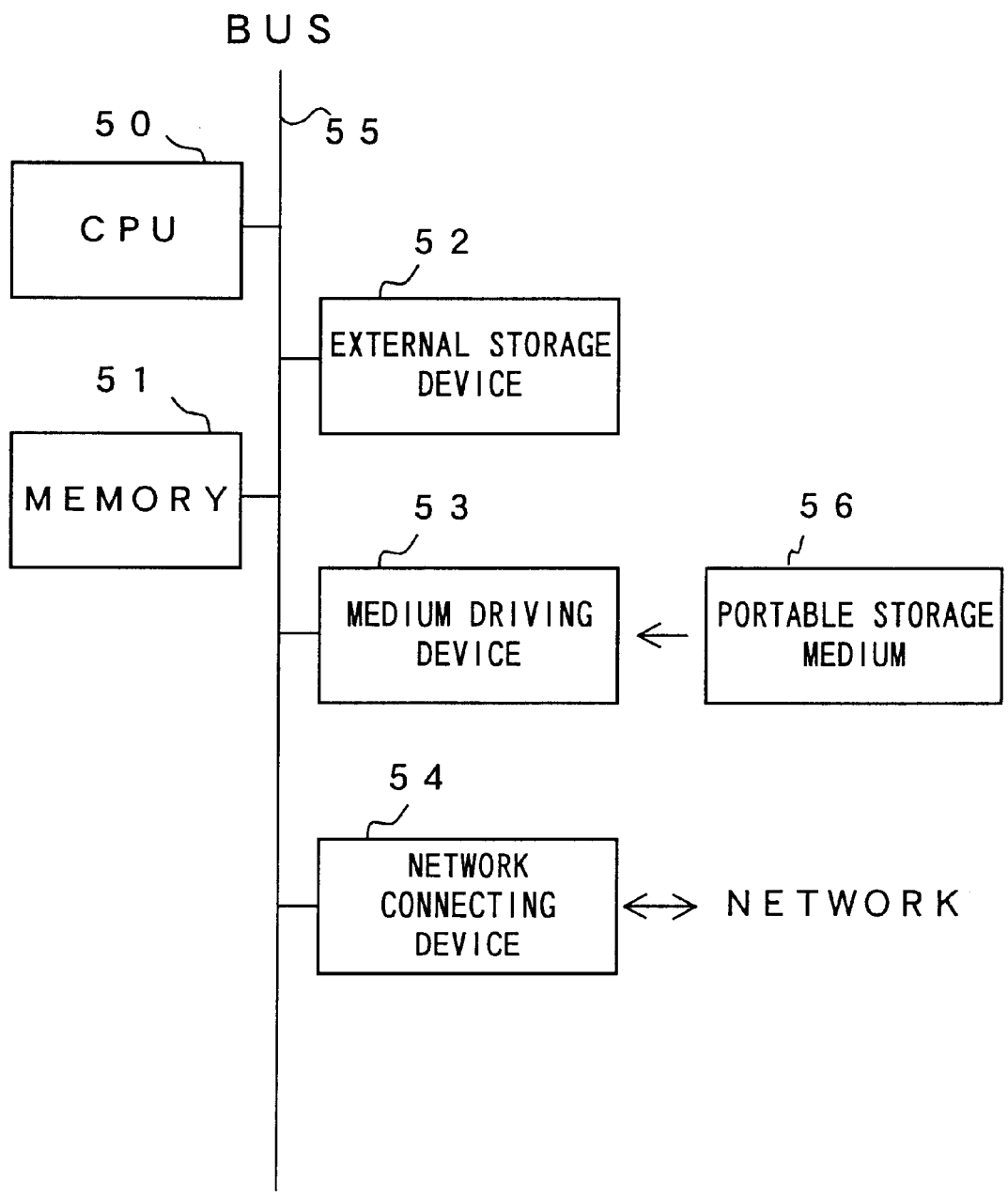
FIG. 11 shows the example where the information processing device shown in FIG. 2 is configured by using a computer system.

FIG. 11 shows the example where the information processing device shown in FIG. 2 is configured by using a computer system. The computer system shown in FIG. 11 includes a CPU (Central Processing Unit) 50, a memory 51, an external storage device 52, a medium driving device 53, and a network connecting device 54, which are interconnected by a bus 55.

The memory 51 stores a program and data used for processing. For example, a ROM (Read Only Memory), a RAM (Random Access Memory), etc. are used as the memory 51. The CPU 50 performs necessary processing with the memory 51 by executing an information processing program according to this preferred embodiment.

Figure 12:
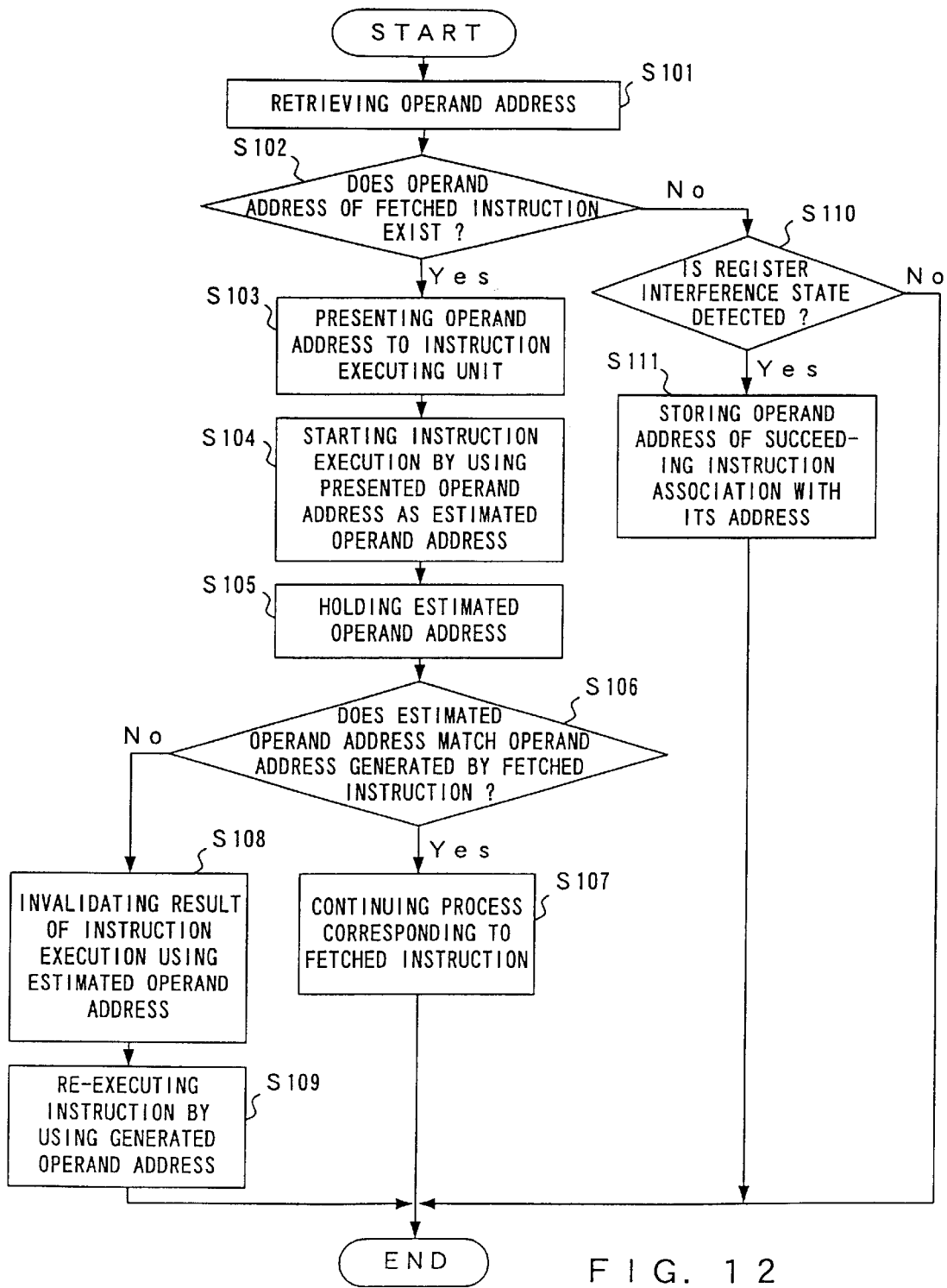
FIG. 12 is a flowchart showing the process performed when an instruction is fetched from the main storage with an information processing program, according to the preferred embodiment of the present invention.

FIG. 12 is a flowchart showing the process performed when an instruction is fetched from the main storage with the information processing program according to the preferred embodiment of the present invention.

In FIG. 12, an operand address is retrieved from the contents stored in step S111, to be described later, according to the address of a fetched instruction when the instruction is fetched from the main storage (step S101). When the operand address is retrieved from the contents stored in step S111 ("YES" in step S102), the retrieved operand address is presented to an instruction executing unit for executing the fetched instruction, along with the fetched instruction (step S103). The instruction executing unit starts the instruction execution including the fetch operation of the main storage operand by using the presented operand address as an estimated operand address before the operand address corresponding to the fetched instruction is generated (step S104). The estimated operand address is stored (step S105), and the comparison between the stored estimated operand address and a generated operand address is made when the register which is used by the fetched instruction in order to generate an operand address becomes available (step S106). If the two operand addresses match in step S106 ("YES" in step S106), the execution of the process corresponding to the fetched instruction is continued (step S107) unchanged. If the two operand addresses are determined to mismatch in step S106 ("NO" in step S106), the result of the instruction execution using the estimated operand address is invalidated (step S108). Then, the instruction is re-executed by using the generated operand address (step S109). If the address of the fetched instruction is not retrieved from the contents stored in step S111, to be described later, ("NO" in step S102), it is determined whether or not the EGI where the register whose contents are rewritten by a preceding instruction matches the register that the fetched instruction uses in order to generate an operand address, occurs (step S110). If it is determined that the EGI occurs in step S110 ("YES" in step S110), the operand address generated when the fetched instruction is executed is stored in association with the address of the fetched instruction (step S111).

As described above, the operand address which is resultant from a previous execution and is stored in step S111 is used as an estimated operand address, so that the execution of a succeeding instruction can be started with the estimated operand address before an actual operand address is generated.

Additionally, the external storage device 52 is, for example, a magnetic disk device, an optical disk device, a magneto-optical disk device, etc. The above described program and data may be stored in the external storage device 52, and may be used by being loaded into a memory depending on need.

The medium driving device 53 drives and accesses a portable storage medium 56. An arbitrary computer-readable storage medium such as a memory card, a floppy disk, a CD-ROM, an optical disk, a magneto-optical disk, etc. is used as the portable storage medium 56. The above described program and data are stored onto the portable storage medium 56, and may be used by being loaded into a memory depending on need.

The network connecting device 54 communicates with other devices via an arbitrary network (line) such as a LAN (Local Area Network), etc. Accordingly, for example, the above described program may be received from an external device depending on need, and may be used by being loaded into a memory.

FIG. 13 shows computer-readable storage media which can provide a program and data to the information processing device shown in FIG. 11. The program and data stored on the portable storage medium 56 or in an external database 57 are loaded into the memory 51. The CPU 50 executes the program by using the loaded data, and performs the necessary processing.

As described above in detail, according to the present invention, the throughput of parallel instruction processing can be prevented from being degraded by estimating, for example, a main storage operand address based on a previous execution result, and by starting the execution of a succeeding instruction even if an EGI as register interference occurs, thereby greatly contributing to the enhancement of the overall performance of an information processing device.

What is claimed is:

1. An information processing device, comprising:
   a detector which detects a register interference state where a register whose contents are rewritten by a preceding instruction is used by a succeeding instruction in order to generate an operand address subject to register interference;
   an operand address history storage which stores the operand address generated, when the succeeding instruction is to be executed, in association with an address of the succeeding instruction, if the register interference state is detected by said detector; and
   an instruction fetcher which presents an operand address along with a fetched instruction to an instruction executing unit for executing the fetched instruction, when the operand address is retrieved from contents stored within said operand address history storage according to an address of the fetched instruction at the time of a fetch operation of an instruction from main storage.

2. The information processing device according to claim 1, wherein said operand address history storage comprises an area for storing a branch destination address obtained when a branch instruction is executed in association with an address of the branch instruction, and a flag for making a distinction from an area storing the operand address in association with the address of the succeeding instruction.

3. The information processing device according to claim 1, further comprising:
   a reservation station which stores the operand address presented by said instruction fetcher along with the address of the fetched instruction in order to perform a stack process for holding instructions to be executed.

4. The information processing device according to claim 1, further comprising:
   an instruction executor which starts instruction execution including a fetch operation of a main storage operand by using the presented operand address as an estimated operand address prior to generation of an operand address corresponding to the fetched instruction, when the operand address retrieved from said operand address history storage is presented by said instruction fetcher.

5. The information processing device according to claim 4, further comprising:
   an operand address comparator which holds the estimated operand address, and for making a comparison between the estimated operand address and an operand address generated when a register which is used by the fetched instruction in order to generate an operand address becomes available, when the instruction execution is started by using the presented operand address as the estimated operand address, wherein execution of a process corresponding to the fetched instruction is continued unchanged if the two operand addresses match.

6. The information processing device according to claim 5, further comprising:
   an instruction re-executor which invalidates a result of the instruction execution by using the estimated operand address, and for re-executing the instruction by using the generated operand address, if said operand address comparator detects that the two operand addresses mismatch.

7. The information processing device according to claim 5, wherein if said operand address comparator detects that the two operand addresses mismatch, said operand address history storage further stores as control information information about an event which causes an estimated operand address error in association with the address of the succeeding instruction.

8. The information processing device according to claim 7, further comprising:
   a second instruction fetcher which modifies the estimated address stored based on the control information, and for presenting the modified address along with a succeedingly fetched instruction to an instruction executing unit for executing the fetched instruction as a newly estimated address, when the control information is retrieved from the contents stored within said operand address history storage according to an address of the succeedingly fetched instruction at the time of a fetch operation of the instruction succeeding the fetched instruction from the main storage.

9. The information processing device according to claim 5, wherein said operand address history storage stores an estimated operand address error in association with the address of the succeeding instruction, if said operand address comparator detects that the two operand addresses mismatch, the information processing device further comprising:
   a second instruction executor which postpones execution of a succeedingly fetched instruction until an operand address is generated when the register which is used by the succeeding instruction in order to generate an operand address becomes available, even if the estimated operand address is retrieved from the contents stored within said operand address history storage according to an address of the succeedingly fetched instruction at the time of a fetch operation of the instruction succeeding the fetched instruction from the main storage.

10. An information processing method, comprising:
    a first step of detecting a register interference state where a register whose contents are rewritten by a preceding instruction is used by a succeeding instruction in order to generate an operand address subject to register interference;
    a second step of storing an operand address generated, when the succeeding instruction is to be executed, in association with an address of the succeeding instruction, if the register interference state is detected by said first step; and
    a third step of presenting an operand address along with a fetched instruction to an instruction executing unit for executing the fetched instruction, when the operand address is retrieved from contents stored in said second step according to an address of the fetched instruction at the time of a fetch operation of an instruction from the main storage.

11. The information processing method according to claim 10, further comprising:

a step of making said instruction executing unit start instruction execution including a fetch operation of a main storage operand by using the presented operand address as an estimated operand address prior to generation of an operand address corresponding to the fetched instruction, when the operand address retrieved from contents stored in said second step is presented in said third step.

12. The information processing method according to claim 11, further comprising:

a fourth step of holding the estimated operand address, and of making a comparison between the estimated operand address and an operand address generated when a register which is used by the fetched instruction in order to generate an operand address becomes available, when the instruction execution is started by using the presented operand address as the estimated operand address, wherein execution of a process corresponding to the fetched instruction is continued unchanged if the two operand addresses match.

13. The information processing method according to claim 12, further comprising:

a step of invalidating a result of the instruction execution by using the estimated operand address, and of re-executing the instruction by using the generated operand address, if a mismatch between the two operand addresses is detected in said fourth step.

14. A computer-readable medium on which is recorded a program for enabling a computer to execute a process, said process comprising:

a first step of detecting a register interference state where a register whose contents are rewritten by a preceding instruction is used by a succeeding instruction in order to generate an operand address subject to register interference;

a second step of storing an operand address generated, when the succeeding instruction is to be executed, in association with an address of the succeeding instruction, if the register interference state is detected by said first step; and a third step of presenting an operand address along with a fetched instruction to an instruction executing unit for executing the fetched instruction, when the operand address is retrieved from contents stored in said second step according to an address of the fetched instruction at the time of a fetch operation of an instruction from the main storage.

15. The medium according to claim 14, further comprising:

a step of making said instruction executing unit start instruction execution including a fetch operation of a main storage operand by using the presented operand address as an estimated operand address prior to generation of an operand address corresponding to the fetched instruction, when the operand address retrieved from contents stored in said second step is presented in said third step.

16. The medium according to claim 15, further comprising:

a fourth step of holding the estimated operand address, and of making a comparison between the estimated operand address and an operand address generated when a register which is used by the fetched instruction in order to generate an operand address becomes available, when the instruction execution is started by using the presented operand address as the estimated operand address, wherein execution of a process corresponding to the fetched instruction is continued unchanged if the two operand addresses match.

17. The medium according to claim 16, further comprising:

a step of invalidating a result of the instruction execution by using the estimated operand address, and of re-executing the instruction by using the generated operand address, if a mismatch between the two operand addresses is detected in said fourth step.

* * * * *